(No Model.)
N. BROWN.
SWING BICYCLE.
No. 356,028. Patented Jan. 11, 1887.
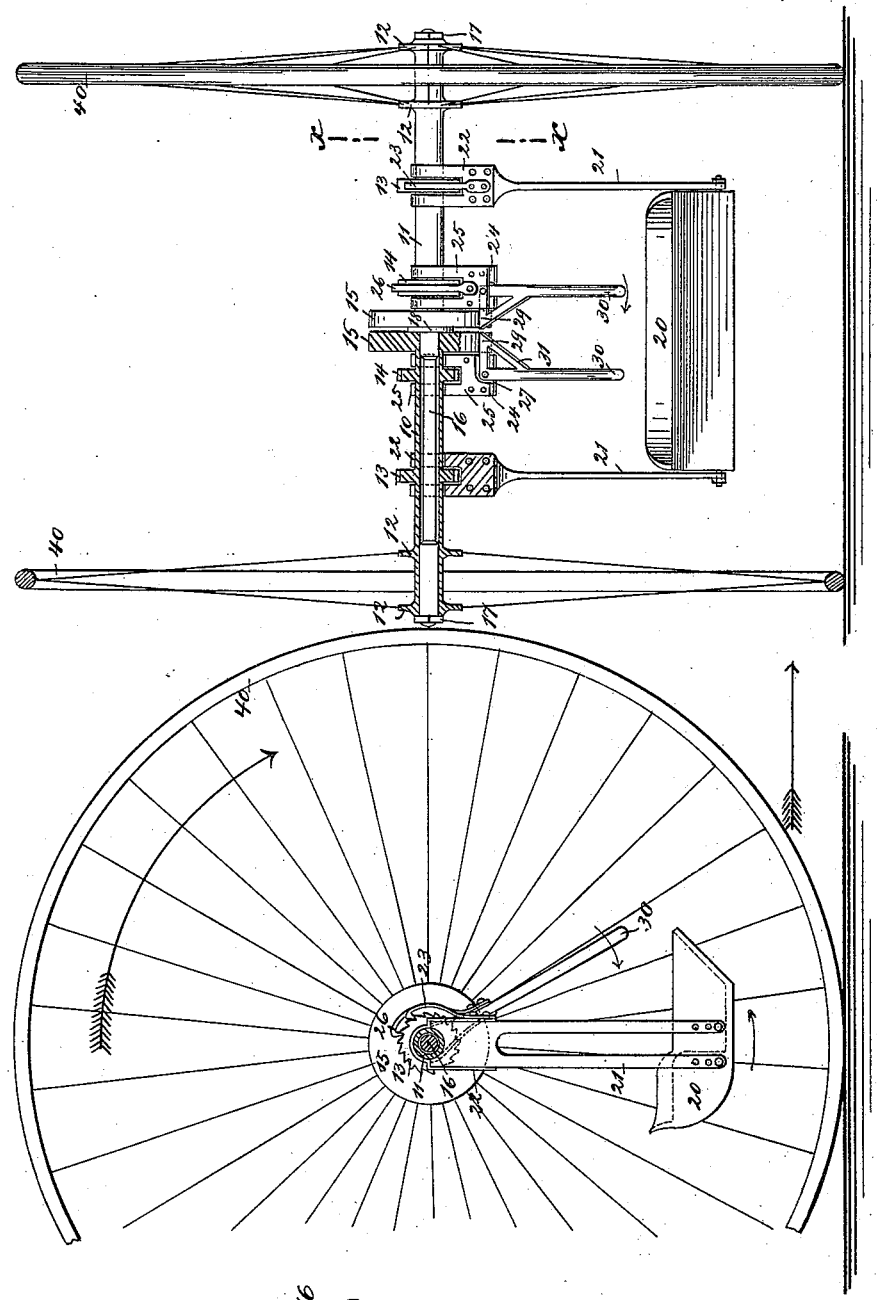
WITNESSES:
Otto Beyer
Ca Sedgwick
INVENTOR:
N. Brown
BY
Munn & Co
ATTORNEYS.

UNITED STATES PATENT OFFICE.

NATHANIEL BROWN, OF EMPORIA, KANSAS.

SWING-BICYCLE.

SPECIFICATION forming part of Letters Patent No. 356,028, dated January 11, 1887.

Application filed November 15, 1886. Serial No. 218,911. (No model.)

*To all whom it may concern:*

Be it known that I, NATHANIEL BROWN, of Emporia, in the county of Lyon and State of Kansas, have invented a new and Improved Swing-Bicycle, of which the following is a full, clear, and exact description.

The object of my invention is to so construct a bicycle that the rider may sit beneath the axle and apply the necessary power to drive the bicycle forward in a manner so that in applying the initial power he and his seat will be drawn slightly forward and in returning to his normal position beneath the axle his weight will act to drive the machine forward, thus providing for the double effect of the power employed to propel the machine.

Reference is to be had to the accompanying drawings, forming a part of this specification, in which similar figures of reference indicate corresponding parts in all the views.

Figure 1 is a view of the forward end of the bicycle, the left-hand wheel and the left-hand portion of the outer hollow shaft and the parts carried thereby being shown in central longitudinal section. Fig. 2 is a cross-sectional view taken on line $x\,x$ of Fig. 1, and Fig. 3 is an enlarged detailed view of one of the driving-levers and its connections.

In constructing such a bicycle as the one illustrated in the drawings above referred to, I provide two outer hollow shafts, 10 and 11, which shafts are formed with the ordinary style of hub-flanges, 12, with ratchet-wheels 13 and 14 and friction-disks 15, the two hollow axles or shafts being mounted upon and supported by a central shaft, 16, the ends of which are threaded to receive the retaining-nuts 17, a collar or washer, 18, being arranged between the disks 15, as clearly shown in Fig. 1.

The seat 20 is suspended by means of arms 21, which arms are connected to centrally-slotted straps 22, that pass over the axles 10 and 11, the ratchet-wheels 13 passing through the central slots of said straps. To the forward upper ends of the arms 21 I secure spring-pawls 23, which engage with the teeth of the ratchet-wheels 13.

In connection with the ratchet-wheels 14 I arrange blocks 24, that are held to the shafts 10 and 11 by straps 25, these blocks being provided with spring-pawls 26, that engage with the teeth of the ratchets 14. In the lower ends of the blocks 24 I form recesses 27, in which there are pivotally mounted lever-arms 30, said arms being provided with inwardly-extending fingers 29, that are supported by braces 31, the fingers 29 approaching each other and being so arranged that by swinging the levers 30 upon their pivotal connections with the blocks 24 they may be brought to bear against the faces of the disks 15.

The wheels of the bicycle, which are shown at 40, may be of any of the ordinary constructions, being, however, preferably made in the manner indicated in the drawings.

In operation the rider occupies the seat 20, and when he desires to start the machine forward pulls down upon the levers 30, moving said levers in the direction of the arrow shown in Fig. 2. This pulling of the lever 30 starts the wheels 40 forward in the direction of the arrow shown in connection therewith, at the same time swinging the seat forward in the direction of its arrow, thus moving the spring-pawls 23 backward against the motion of the ratchet-wheels, and bringing them into engagement with teeth upon their ratchets that are not so far advanced as were the teeth with which they were primarily engaged. After the initial force upon the levers 30 is relaxed and the levers are moved forward the swing of the seat toward its normal position will act to advance the bicycle, and by so reciprocating the levers 30 it will be seen that a pendulous motion will be imparted to the seat, so that after the machine is once started it will be propelled for some time by this pendulous motion.

When it is desired to turn the machine, say, to the left, a preponderance of force is exerted upon the right-hand lever, which will tend to drive the right-hand wheel forward at a greater speed than that imparted to the left-hand wheel; or the left-hand lever could be moved in the direction of the arrow shown in connection therewith in Fig. 1, so as to bring its finger 29 to bear against its disk 15, thus breaking or checking the motion of the left-hand wheel. When it is desired to stop the machine the lower ends of the levers 30 are moved toward each other and the fingers 29 thereby brought to bear against the disks 15, and so bearing against the said disks the fingers will check the movement of the wheels.

One of the greatest advantages arising from the construction described is that the rider may stop at any point he may desire in ascending a grade, and without holding on to the machine may rest at ease, for any tendency of the machine to run backward would be counteracted by the weight of the seat.

Having thus fully described my invention, I claim as new and desire to secure by Letters Patent—

1. In a bicycle, the combination, with the axle, of two hollow axles thereon, two ratchet-wheels on each hollow axle, a swinging seat having pawls engaging a ratchet on each hollow axle, and operating-levers also having pawls engaging the other two ratchets, substantially as set forth.

2. In a bicycle, the combination, with a central shaft, of hollow shafts carried thereby, wheels carried by the hollow shaft, two ratchets carried by each hollow shaft, disks also carried by the hollow shafts, a seat suspended from the hollow shafts, spring-pawls carried by the seat-suspending attachments and arranged to engage with one set of ratchet-wheels, levers connected to the hollow shafts, pawls carried by the levers and arranged to engage with the other set of ratchet-wheels carried by the hollow shafts, said levers being provided with fingers, which may be turned to bear against the friction-disks, substantially as described.

3. In a bicycle, the combination of the following elements, viz: a central shaft, 16, hollow shafts 10 and 11, ratchets 13 and 14, disks 15, wheels 40, straps 22, suspending-arms 21, seat 20, spring-pawls 23, blocks 24, straps 25, pawls 26, and levers 30, formed with fingers 29, substantially as described.

NATHANIEL BROWN.

Witnesses:
A. F. FLORY,
A. M. FLORY.